(12) United States Patent
Murakami et al.

(10) Patent No.: US 8,882,360 B2
(45) Date of Patent: Nov. 11, 2014

(54) CONICAL ROLLER BEARING DEVICE

(75) Inventors: Motoichi Murakami, Gotenba (JP); Kenichi Harada, Susono (JP); Kenichi Nakaoka, Oume (JP); Yoshitaka Waseda, Nisshin (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/805,937

(22) PCT Filed: Jun. 28, 2011

(86) PCT No.: PCT/IB2011/001832
§ 371 (c)(1),
(2), (4) Date: Dec. 20, 2012

(87) PCT Pub. No.: WO2012/001517
PCT Pub. Date: Jan. 5, 2012

(65) Prior Publication Data
US 2013/0266252 A1 Oct. 10, 2013

(30) Foreign Application Priority Data

Jun. 29, 2010 (JP) ................. 2010-147988

(51) Int. Cl.
*F16C 33/46* (2006.01)
*F16C 19/28* (2006.01)
*F16C 33/60* (2006.01)
*F16C 19/30* (2006.01)
*F16C 25/08* (2006.01)
*F01L 1/047* (2006.01)
*F01L 1/344* (2006.01)
*F16C 19/52* (2006.01)
*F16C 19/54* (2006.01)

(52) U.S. Cl.
CPC ............... *F16C 25/08* (2013.01); *F01L 1/047* (2013.01); *F01L 1/3442* (2013.01); *F16C 19/525* (2013.01); *F16C 19/54* (2013.01); *F16C 33/4605* (2013.01); *F01L 2001/0476* (2013.01); *F16C 2360/18* (2013.01); *F16C 2360/22* (2013.01)
USPC ............ 384/571; 384/565; 384/577; 384/623

(58) Field of Classification Search
CPC ........ F16C 33/36; F16C 33/48; F16C 33/366; F16C 25/08; F16C 2360/18; F16C 19/54
USPC ......... 384/462, 470, 473–474, 476, 523, 548, 384/563, 565, 571, 572, 577, 623
See application file for complete search history.

(56) References Cited

U.S. PATENT DOCUMENTS 2,019,464 A * 10/1935 Riblet ........................... 384/571
2,284,446 A * 5/1942 Powers ......................... 384/466

(Continued)

FOREIGN PATENT DOCUMENTS

| CN | 1165254 A | 11/1997 |
| CN | 201428739 Y | 3/2010 |

(Continued)

OTHER PUBLICATIONS

International Search Report and Written Opinion for corresponding International Patent Application No. PCT/IB2011/001832 mailed Oct. 31, 2011.

*Primary Examiner* — Marcus Charles
(74) *Attorney, Agent, or Firm* — Sughrue Mion, PLLC

(57) ABSTRACT

A conical roller bearing device includes: a conical roller bearing that includes an inner ring (24) that has an outer raceway surface on its outer peripheral surface, an outer ring (22) that has an inner raceway surface on its inner peripheral surface, a retainer (26), and a plurality of conical rollers that are rollably arranged between the outer raceway surface of the inner ring (24) and the inner raceway surface of the outer ring (22) and that are respectively accommodated in pockets formed in the retainer (26); and a pressing mechanism that presses the retainer (26) in a direction to reduce gaps between the conical rollers and the outer raceway surface of the inner ring (24) and gaps between the conical rollers and the inner raceway surface of the outer ring (22) along center axes of the inner ring (24) and outer ring (22).

6 Claims, 4 Drawing Sheets

(56) References Cited

U.S. PATENT DOCUMENTS

| | | | |
|---|---|---|---|
| 2,605,148 A * | 7/1952 | Shoup | 384/563 |
| 3,833,277 A * | 9/1974 | Jones et al. | 384/459 |
| 3,885,842 A * | 5/1975 | Furutsu | 384/468 |
| 3,940,191 A * | 2/1976 | Tomioka et al. | 384/468 |
| 4,824,264 A * | 4/1989 | Hoebel | 384/571 |
| 5,803,616 A * | 9/1998 | Persson et al. | 384/473 |
| 6,113,513 A | 9/2000 | Itoh et al. | |
| 6,428,212 B1 * | 8/2002 | Tanaka | 384/475 |
| 6,732,600 B2 * | 5/2004 | Greubel | 74/89.44 |
| 7,036,989 B2 * | 5/2006 | Taki et al. | 384/475 |
| 7,044,643 B2 * | 5/2006 | Greubel | 384/475 |
| 7,431,510 B2 * | 10/2008 | Schott | 384/462 |

FOREIGN PATENT DOCUMENTS

| | | |
|---|---|---|
| DE | 10 2006 042 675 A1 | 3/2008 |
| JP | 05-006250 U | 1/1993 |
| JP | 10-238606 A | 9/1998 |
| JP | 2001-140896 A | 5/2001 |
| JP | 2006-177268 A | 7/2006 |
| JP | 2008-025716 A | 2/2008 |
| JP | 2008-232299 A | 10/2008 |
| JP | 2008-240915 A | 10/2008 |

* cited by examiner

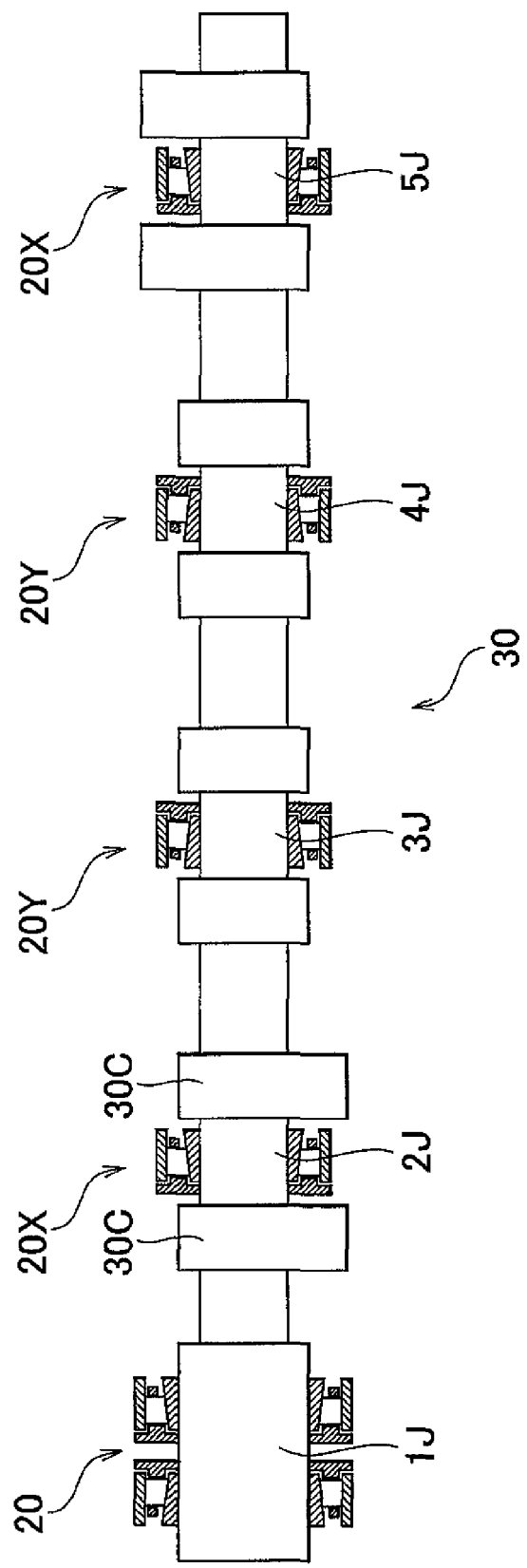

CONICAL ROLLER BEARING DEVICE

BACKGROUND OF THE INVENTION

1. Field of the Invention

The invention relates to a conical roller bearing device and, more particularly, to a conical roller bearing device that is suitable for supporting a rotary shaft, such as a camshaft and an output shaft, in an engine or transmission for a vehicle.

2. Description of Related Art

Generally, a conical roller bearing withstands a large load. The conical roller bearing is able to withstand a radial load, an axial load and a combined load of the radial load and the axial load, and also has a high bearing stiffness, so the conical roller bearing is not only used in automobiles but also widely used in other fields. In recent years, particularly, centered on automobiles, in response to a request for resource savings and low environmental loads, there has been an effort to reduce friction torque of a bearing device of a rotary shaft of an engine or transmission of an automobile in order to reduce a friction loss to thereby improve fuel economy. For this purpose, recently, not only a plain bearing but also a rolling bearing, including a conical roller bearing, has been widely used.

Incidentally, such a conical roller bearing is generally used in a state where a preload is applied in the axial direction of the conical roller bearing in order to ensure bearing stiffness and to suppress generation of noise (unusual noise) and vibrations. A known method of applying a preload is fixed position preloading and constant pressure preloading. The fixed position preloading is to keep the relative position in the axial direction between facing inner and outer rings constant during usage of a conical roller bearing, while the constant pressure preloading is to apply an appropriate preload to inner and outer rings using a coil spring, a belleville spring, or the like, to thereby keep a preload amount substantially constant even when the relative position changes during usage of a conical roller bearing.

Incidentally, in the above described fixed position preloading, it is known that a so-called loss of preload due to a difference in coefficient of thermal expansion between both members that are fitted to the conical roller bearing. Then, in order to solve the above problem, Japanese Utility Model Application Publication No. 05-006250 (JP-U-05-006250) describes a technique for eliminating an insufficient preload in such a manner that a thrust washer made of a shape-memory alloy is interposed between a bearing housing and an end portion of an outer ring and then the thrust washer is elastically deformed with an increase in temperature to urge the outer ring in the axial direction.

In addition, Japanese Patent Application Publication No. 2008-240915 (JP-A-2008-240915) describes a rolling bearing device. In the rolling bearing device, a bearing housing that is one of both members to which the conical roller bearing is fitted has a first linear expansion coefficient, a rotary shaft that is the other one of both members has a second linear expansion coefficient smaller than the first linear expansion coefficient, and an internal screw portion is formed on part of the inner periphery of the bearing housing. The rolling bearing device includes a pressing member, a sensor and preload maintaining means. The pressing member has an external screw portion screwed to the internal screw portion on its outer periphery, and is displaceable in the axial direction. The sensor detects a difference in thermal expansion between the bearing housing and the rotary shaft. The preload maintaining means allows the pressing member to rotate on the basis of the result detected by the sensor to press the outer ring in the axial direction to thereby maintain the preload on the rolling bearing in the axial direction.

Incidentally, in each of the conical roller bearing device described in JP-U-05-006250 and the conical roller bearing device described in JP-A-2008-240915, the outer ring or the inner ring, which is one of the outer ring and the inner ring that constitute the conical roller bearing, is pressed in the axial direction to be moved in the axial direction relative to the inner ring or the outer ring, which is the other one of the outer ring and the inner ring, to thereby maintain a preload. However, when the outer ring or the inner ring is pressed in the axial direction to displace the outer ring or the inner ring in the axial direction, the outer ring is not rotating relative to the bearing housing or the inner ring is not rotating relative to the rotary shaft, so the friction resistance between the outer ring and the bearing housing or the friction resistance between the inner ring and the rotary shaft is large. As a result, in order to relatively displace the outer ring or the inner ring in the axial direction, large driving force that overcomes the friction resistance is required, so there has been a problem that it is necessary to provide a complex and expensive mechanism, such as a booster mechanism. In addition, when the outer ring or the inner ring is relatively displaced in the axial direction, friction arises on the sliding surface. As a result, there is a possibility that it becomes difficult to displace the outer ring or the inner ring over long-term usage.

SUMMARY OF THE INVENTION

The invention provides a conical roller bearing device that is able to apply a preload with a simple configuration and that is able to ensure bearing stiffness irrespective of a difference in coefficient of thermal expansion.

A first aspect of the invention relates to a conical roller bearing device. The conical roller bearing device includes: a conical roller bearing that includes an inner ring that has an outer raceway surface on its outer peripheral surface, an outer ring that has an inner raceway surface on its inner peripheral surface, a retainer, and a plurality of conical rollers that are rollably arranged between the outer raceway surface of the inner ring and the inner raceway surface of the outer ring and that are respectively accommodated in pockets formed in the retainer; and a pressing mechanism that presses the retainer in a direction to reduce gaps between the conical rollers and the outer raceway surface of the inner ring and gaps between the conical rollers and the inner raceway surface of the outer ring along center axes of the inner ring and outer ring.

According to the above aspect of the invention, the retainer that accommodates the plurality of conical rollers in the respective pockets is pressed by the pressing mechanism in the direction to reduce gaps between the conical rollers and the outer raceway surface of the inner ring and gaps between the conical rollers and the inner raceway surface of the outer ring along the center axes of the inner ring and outer ring. The retainer is in contact with only the conical rollers, the axial position of the retainer is restricted by the conical rollers, and the conical rollers roll between the outer raceway surface of the inner ring and the inner raceway surface of the outer ring, so the friction resistance that is generated when the retainer is displaced in the axial direction along the center axes of the inner ring and outer ring is small. Thus, the pressing mechanism for pressing the retainer may have a simple structure that does not require large driving force.

Here, in the above configuration, the pressing mechanism may include a hydraulic chamber and a hydraulic supply portion, the hydraulic chamber may be defined by a rib formed in the retainer so as to be positioned on a side of the inner ring and outer ring in an axial direction, and the hydraulic supply portion may supply a predetermined hydraulic pressure to the hydraulic chamber.

With the above configuration, a predetermined hydraulic pressure is supplied from the hydraulic supply portion to the hydraulic chamber that is defined by the rib formed in the retainer to press the retainer in the axial direction. Thus, even when the retainer rotates (revolves) with the rolling (including rotation and revolution) of the conical rollers, a load source that presses the retainer is a fluid, and there is no mechanical solid contact, so friction force is small and there is no possibility of breakage.

Furthermore, in the above configuration, the conical roller bearing device may further include a displacement restricting mechanism that restricts an amount of displacement of the retainer in a direction opposite to the direction in which the pressing mechanism presses the retainer.

With the above configuration, the amount of displacement of the retainer in the direction opposite to the direction in which the pressing mechanism presses the retainer is restricted by the displacement restricting mechanism, so, for example, even when no predetermined hydraulic pressure is supplied from the hydraulic supply portion to the hydraulic chamber, displacement of the retainer is suppressed, and a loss of preload, a skew of the conical rollers, or the like, is suppressed.

In the above configuration, the conical roller bearing device may further include a seal member. In this case, the hydraulic chamber may be defined between the rib and the seal member.

In the above configuration, the conical roller bearing may be a double row conical roller bearing, and the hydraulic chamber may be defined between the ribs that are respectively formed in the double row retainers. In this case, the displacement restricting mechanism may be provided between the ribs.

Furthermore, in the above, the inner raceway surface of the outer ring may be parallel to the center axis of the outer ring.

With the above configuration, when the bearing housing to which the outer ring is fixedly fitted is, for example, made of a material having a high coefficient of thermal expansion, the angle of the inner raceway surface remains unchanged irrespective of a variation in the inside and outside diameters of the outer ring with contraction or expansion of the bearing housing due to a variation in temperature, so the one-sided contact of the conical rollers does not occur and one-sided wear and a decrease in service life due to the one-sided contact are suppressed.

A second aspect of the invention relates to a conical roller bearing device for a camshaft. The conical roller bearing device includes: a first conical roller bearing that includes a first inner ring that has an outer raceway surface on its outer peripheral surface and that is fitted to the camshaft, a first outer ring that has an inner raceway surface on its inner peripheral surface and that is fixed to a bearing housing, a first retainer, and a plurality of first conical rollers that are rollably arranged between the outer raceway surface of the first inner ring and the inner raceway surface of the first outer ring and that are respectively accommodated in pockets formed in the first retainer; a first pressing mechanism that presses the first retainer in a direction to reduce gaps between the first conical rollers and the outer raceway surface of the first inner ring and gaps between the first conical rollers and the inner raceway surface of the first outer ring along center axes of the first inner ring and first outer ring, and that presses the first retainer in a first axial direction; a second conical roller bearing that includes a second inner ring that has an outer raceway surface on its outer peripheral surface and that is fitted to the camshaft, a second outer ring that has an inner raceway surface on its inner peripheral surface and that is fixed to the bearing housing, a second retainer, and a plurality of second conical rollers that are rollably arranged between the outer raceway surface of the second inner ring and the inner raceway surface of the second outer ring and that are respectively accommodated in pockets formed in the second retainer; and a second pressing mechanism that presses the second retainer in a direction to reduce gaps between the second conical rollers and the outer raceway surface of the second inner ring and gaps between the second conical rollers and the inner raceway surface of the second outer ring along center axes of the second inner ring and second outer ring, and that presses the second retainer in a second axial direction opposite to the first axial direction, wherein the total number of the first conical roller bearings is equal to the total number of the second conical roller bearings.

According to the second aspect, in addition to the functions and advantageous effects obtained from the conical roller bearing device according to the first aspect of the invention, the first conical roller bearing of which the direction in which the pressing mechanism presses the retainer is the first axial direction and the second conical roller bearing of which the direction in which the pressing mechanism presses the retainer is the second axial direction opposite to the first axial direction are arranged on the camshaft so that the total number of the first conical roller bearings is equal to the total number of the second conical roller bearings, so axial loads (thrust loads) are cancelled to thereby make it possible to reduce the number of required conical roller bearings and to suppress the overall length of the camshaft.

Here, in the above configuration, the camshaft may have a first journal portion at its front end side to which a cam sprocket is connected, and may have cam lobe journal portions at positions corresponding to cam lobes that correspond to respective cylinders, the first conical roller bearing and the second conical roller bearing may be arranged at the first journal portion, and the first conical roller bearing and the second conical roller bearing may be alternately arranged at the cam lobe journal portions in accordance with an ignition order of the cylinders.

According to the above configuration, even when thrust loads occur, opposite thrust loads alternately occur in accordance with the ignition order, so a load on the bearing housing may be reduced in comparison with the case where thrust loads in the same direction successively occur.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a cross-sectional view that shows a conical roller bearing device for a camshaft according to an embodiment of the invention.

DETAILED DESCRIPTION OF EMBODIMENTS

Hereinafter, embodiments of the invention will be described in detail with reference to the accompanying drawings.

Figure 1A:
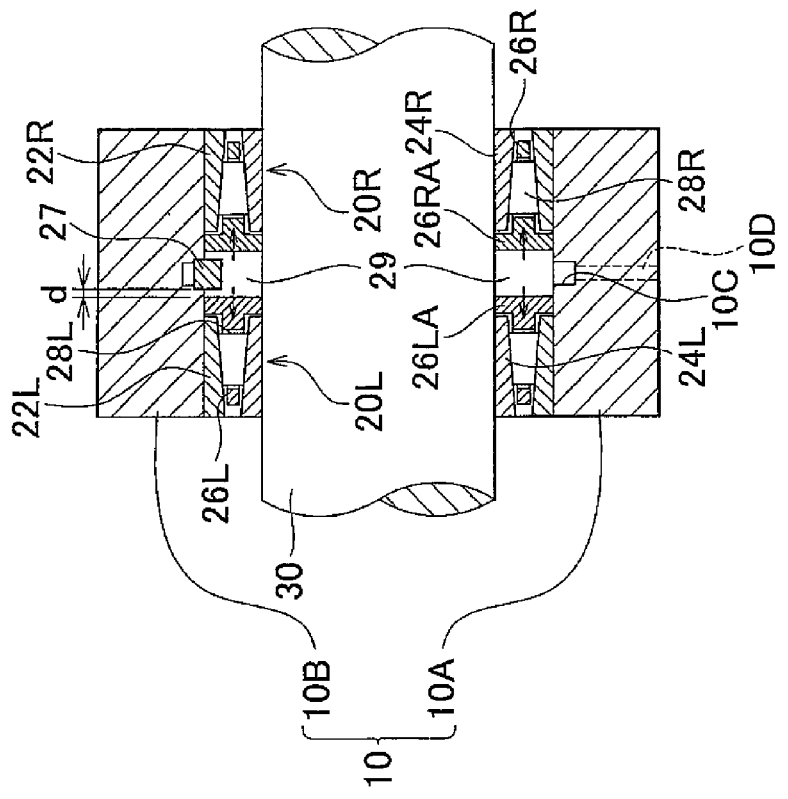
FIG. 1A is a cross-sectional view that shows a conical roller bearing device at a low temperature according to a first embodiment of the invention.
Figure 1B:
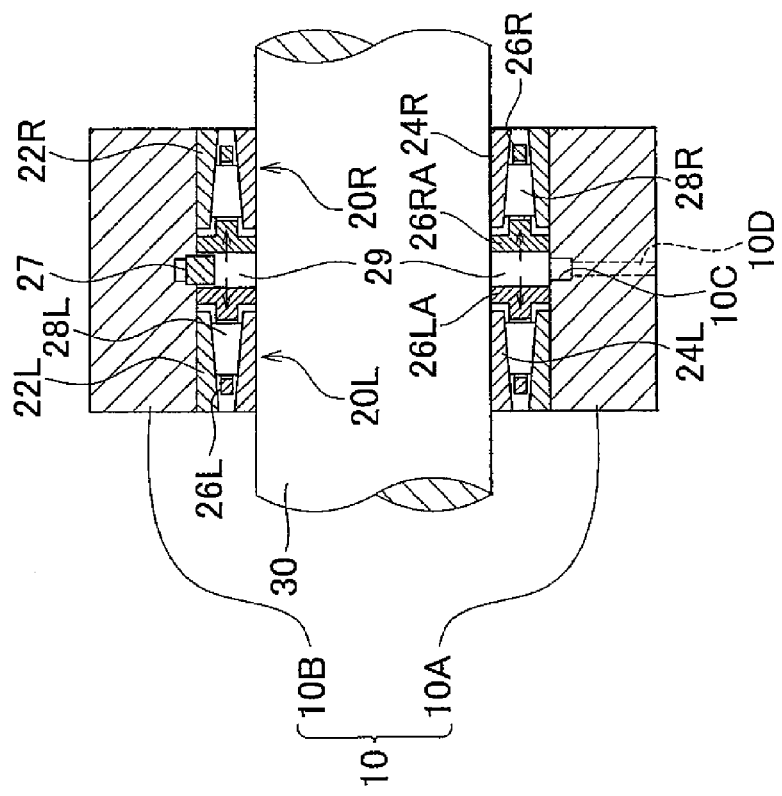
FIG. 1B is a cross-sectional view that shows the conical roller bearing device at a high temperature according to the first embodiment of the invention.

First, a first embodiment in which a conical roller bearing device according to the aspect of the invention is used for a camshaft of an engine will be described with reference to FIG. 1A and FIG. 1B.

In the present embodiment, a bearing housing 10 is formed of a cam housing 10A and a cap 10B. The cam housing 10A is integrally formed with a cylinder head (not shown) or is separately formed and assembled to the cylinder head. The cap 10B is fixed to the cam housing 10A by bolts (not shown). Each of the cam housing 10A and the cap 10B has a semicolumnar recess. When both the cam housing 10A and the cap 10B are assembled to each other, a columnar bearing housing accommodating portion is formed. The bearing housing accommodating portion accommodates a conical roller bearing 20. The conical roller bearing 20 according to the present embodiment includes outer rings 22, inner rings 24 and a plurality of conical rollers 28. Each of the outer rings 22 is fitted to the bearing housing 10. Each of the inner rings 24 is fitted to the outer peripheral surface of a camshaft 30 that serves as a rotary shaft. The plurality of conical rollers 28 are arranged between each inner ring 24 and a corresponding one of the outer rings 22, and are respectively accommodated in pockets of each of annular retainers 26 so as to be retained at equiangular positions in the circumferential direction. The plurality of conical rollers 28 serve as rolling elements. Each of the conical rollers 28 has a truncated cone shape and has a predetermined cone angle.

Then, the conical roller bearing 20 according to the first embodiment is formed so that the inner raceway surface of each outer ring 22 and the outer raceway surface of each inner ring 24 each have a predetermined angle with respect to the rotation center axis of the conical roller bearing 20 and, by extension, the rotation center axis of the camshaft 30 and the angle made between the inner raceway surface of each outer ring 22 and the outer raceway surface of a corresponding one of the inner rings 24 is substantially equal to the conical angle of each conical roller 28. Note that FIG. 1A and FIG. 1B show the so-called double row conical roller bearings 20 in which a plurality of rows formed of the plurality of conical rollers 28 are arranged so that the respective conical angles are inverted from each other. In FIG. 1A and FIG. 1B, the right and left outer rings 22 and the right and left inner rings 24 are arranged to form raceway surfaces with which the right and left conical rollers 28 are respectively in contact. Here, in the following description, when it is necessary to distinguish the right and left rows of the conical roller bearing 20 from each other, "R" or "L" is suffixed to the reference numerals of the outer ring 22, inner ring 24, retainer 26 and conical rollers 28 that are the components of a corresponding one of the right and left conical roller bearings 20. However, when the description refers commonly to the right and left rows of the conical roller bearing 20 and it is not necessary to distinguish the right and left rows of the conical roller bearing 20 from each other, the original reference numerals are used without suffixes.

An annular groove 10C is formed on the inner peripheral surface of the accommodating portion of the bearing housing 10 in which the right and left conical roller bearings 20R and 20L are accommodated, The annular groove 10C constitutes a circumferential oil passage. Then, a radial oil passage 10D is open to the annular groove 10C. The radial oil passage 10D is formed in the cam housing 10A (or may be formed in the cap 10B), and is in fluid communication with an oil pump (not shown) that serves as a hydraulic supply source. Furthermore, the right and left retainers 26R and 26L each retain the conical rollers 28 in the pockets. The right and left retainers 26R and 26L respectively have right and left annular ribs 26RA and 26LA so as to respectively face the axial side surfaces of the right inner ring 24R and right outer ring 22R and the axial side surfaces of the left inner ring 24L and left outer ring 22L. In other words, the outside diameter of each of these right and left annular ribs 26RA and 26LA is substantially equal to the inside diameter of the accommodating portion of the bearing housing 10, and the inside diameter of each of these right and left annular ribs 26RA and 26LA is substantially equal to the outside diameter of the camshaft 30. Here, the axial side surface of the inner/outer ring is one of the side surfaces of the inner/outer ring which are arranged in the axial direction. Thus, a hydraulic chamber 29 is defined between the axial facing surfaces of the right and left ribs 26RA and 261A and between the camshaft 30 and the bearing housing 10. The hydraulic chamber 29 constitutes part of a pressing mechanism. Furthermore, a pin 27 is provided for the bearing housing 10 at a position between the facing surfaces of the right and left ribs 26RA and 26LA. The pin 27 restricts the amount of axial displacement of the right and left retainers 26R and 26L toward the hydraulic chamber 29. The pin 27 serves as a displacement restricting mechanism. Note that the number of the pins 27 needs to be at least one as a so-called stopper for restricting the displacement; however, in terms of suppressing the inclination of the retainers 26, it is desirable to provide about three pins 27 at equiangular positions in the circumferential direction.

Here, in the present embodiment, the bearing housing 10 formed of the cam housing 10A and the cap 10B is made of a light metal, such as an aluminum alloy, having a relatively high linear expansion coefficient for weight reduction, while the inner and outer rings and rolling elements of the conical roller bearing 20 and the camshaft are made of, for example, a steel having about half the linear expansion coefficient of an aluminum alloy for strength. Thus, when the engine is cold (the temperature of the engine is low), for example, immediately after the start of the engine, as shown in FIG. 1A, the bearing housing 10 is in a contracted state and, therefore, the interference of the bearing housing 10 against the outer rings 22 is large in each of the right and left rows 20R and 20L of the conical roller bearing; whereas, when the temperature of the engine is high, for example, after the warm-up of the engine, the bearing housing 10 expands and, therefore, the interference of the bearing housing 10 against the outer rings 22 reduces accordingly. For this reason, the inside and outside diameters of each outer ring 22 vary, and, particularly, a gap is formed, for example, between the inner raceway surface of each outer ring 22 and the corresponding conical rollers 28.

However, according to the thus configured first embodiment, oil that is regulated to a predetermined pressure is introduced from the oil pump into the hydraulic chamber 29 via the radial oil passage 10D formed in the cam housing 10A of the bearing housing 10 and the circumferential oil passage formed of the annular groove 10C. The oil that has a predetermined pressure and that is introduced into the hydraulic chamber 29 presses the right and left retainers 26R and 26L, of which the amount of displacement is restricted by the pin 27 within a predetermined distance between the facing surfaces, in a direction to reduce gaps between the outer raceway surface of each inner ring 24 and the corresponding conical rollers 28 and gaps between the inner raceway surface of each outer ring 22 and the corresponding conical rollers 28 along the center axes of the inner rings 24 and outer rings 22 to thereby apply a preload. Specifically, the right and left retainers 26R and 26L are displaced by an axial distance d shown in FIG. 1B (only the left side is illustrated) so as to substantially eliminate (automatically adjust) the gaps between the outer raceway surface of each inner ring 24 and the corresponding conical rollers 28 and the gaps between the inner raceway surface of each outer ring 22 and the corresponding conical rollers 28. Incidentally, each retainer 26 is in contact with only the conical rollers 28 accommodated in the pockets, and the axial position of the retainer 26 is restricted by the positions at which the conical rollers 28 are in contact with the outer raceway surface of a corresponding one of the inner rings 24 and the inner raceway surface of a corresponding one of the outer rings 22. In addition, the conical rollers 28 roll between the outer raceway surface of a corresponding one of the inner rings 24 and the inner raceway surface of a corresponding one of the outer rings 22, so the friction resistance that is generated when each retainer 26 is displaced in the axial direction along the center axes of the inner ring 24 and outer ring 22 is small. Thus, the pressing mechanism for displacing the retainer 26 in the axial direction does not need to use a booster mechanism, or the like, and the pressing mechanism may have a simple structure using hydraulic pressure.

Hereinafter, conical roller bearing devices according to other embodiments of the invention will be described. In these embodiments, the basic configuration is substantially the same as that of the above described first embodiment, so like reference numerals denote components having the same functions and the overlap description is omitted, and then the differences from the first embodiment will be specifically described.

Figure 2:
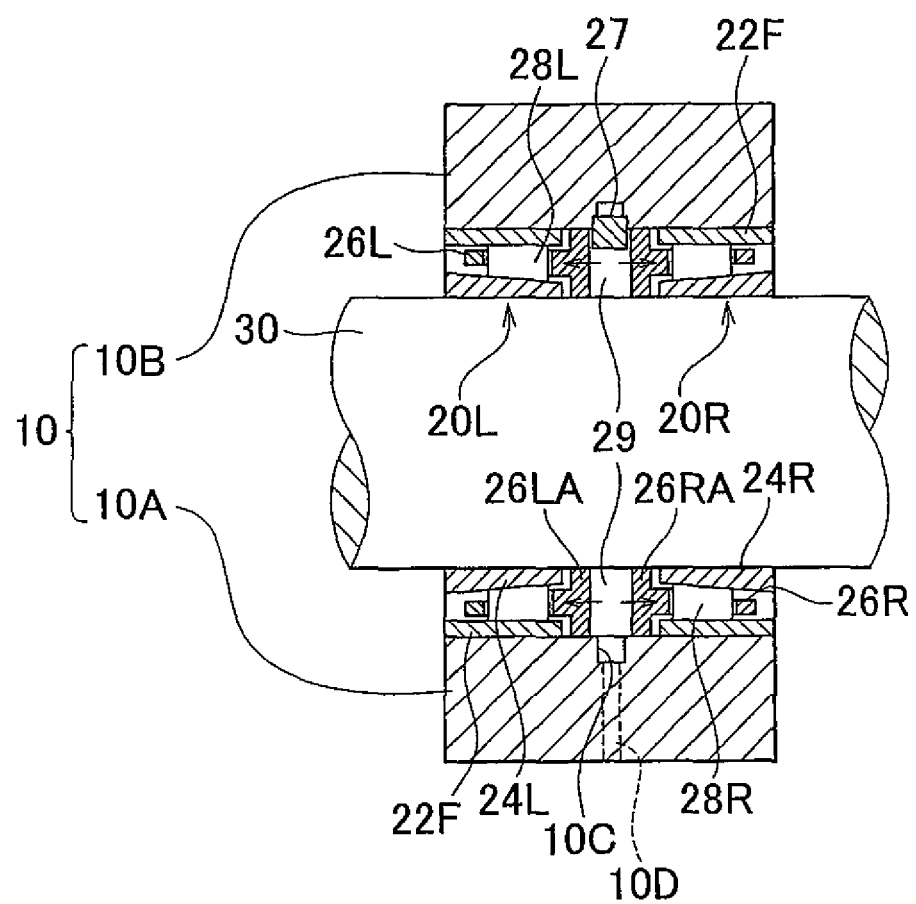
FIG. 2 is a cross-sectional view that shows a conical roller bearing device according to a second embodiment of the invention.

In a second embodiment shown in FIG. 2, instead of the outer rings each being inclined with respect to the center axis in the first embodiment, the outer rings each have an inner raceway surface that is parallel to the center axis of the outer ring. That is, the outer rings 22F each have an outer peripheral surface and an inner raceway surface that are parallel to the center axis of the outer ring 22F.

This is because of the following reason. That is, the bearing housing 10 formed of the cam housing and the cap to which the outer rings 22F are fitted is made of a light metal, such as an aluminum alloy, having a relatively high linear expansion coefficient as described above, and has an interference over all the temperature range, so it is difficult to avoid a variation in the inside and outside diameters of each outer ring with contraction and expansion of the bearing housing due to a variation in temperature. Note that the inner rings are fitted to a steel, so a variation in the inside and outside diameters of each inner ring is smaller than that of each outer ring. Thus, when each outer ring has an inclined inner raceway surface, the amount of contraction of a thin portion of the outer ring increases when the interference against the bearing housing is large (at a low temperature) and, therefore, the angle of the inner raceway surface with respect to the center axis is smaller than a set angle; whereas the amount of contraction of a thin portion of each outer ring reduces when the interference against the bearing housing is small (at a high temperature) and, therefore, the angle of the inner raceway surface with respect to the center axis is larger than the set angle. As a result, when the outer rings each have an inclined inner raceway surface, there is a possibility that the angle at which the inclined inner raceway surface is in contact with each conical roller varies with a variation in temperature to bring the conical rollers into contact with the inner raceway surface at one side and, as a result, the service life of the bearing is significantly reduced through one-sided wear.

However, according to the second embodiment in which the outer rings 22F each have an outer peripheral surface and an inner raceway surface that are parallel to the center axis of the outer ring, even when the bearing housing 10 to which the outer rings 22F are fixedly fitted is, for example, made of a material having a high coefficient of thermal expansion and the inside and outside diameters of each outer ring 22F vary with contraction or expansion of the bearing housing 10 due to a variation in temperature, there is no difference in thickness in each outer ring as described above, so the angle of the inner raceway surface remains unchanged to suppress one-sided wear and a decrease in service life due to the one-sided contact of the conical rollers 28.

Next, a conical roller bearing device according to a third embodiment of the invention will be described with reference to FIG. 3.

Figure 3:
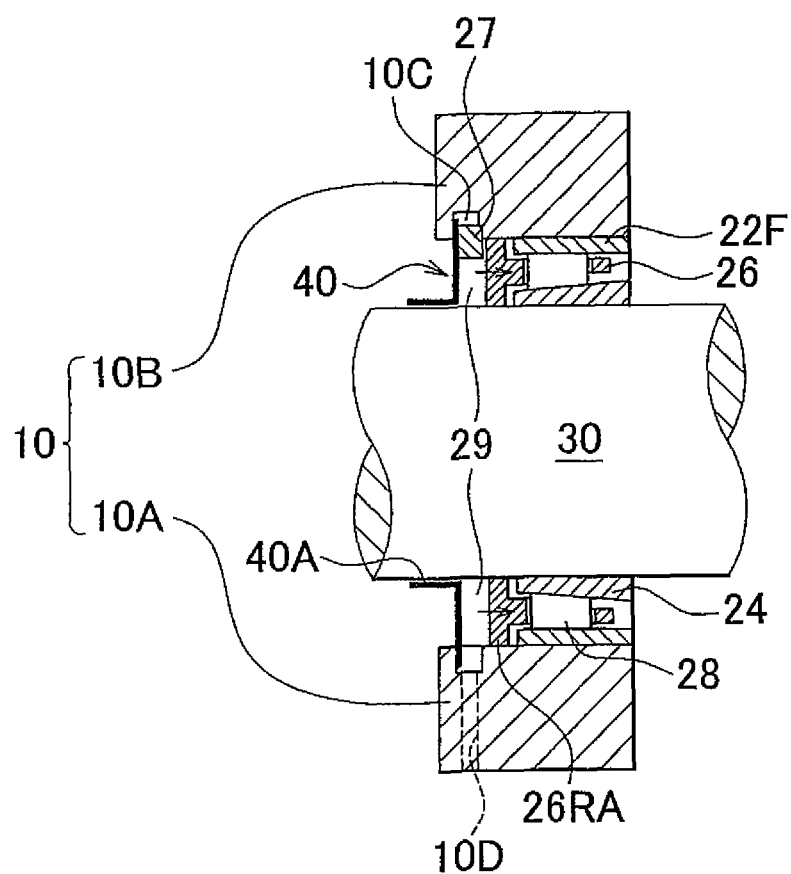
FIG. 3 is a cross-sectional view that shows a conical roller bearing device according to a third embodiment of the invention.

In contrast to the above described embodiments that describe the so-called double row conical roller bearing, the third embodiment shown in FIG. 3 applies the aspect of the invention to a so-called single row conical roller bearing. That is, in the third embodiment shown in FIG. 3, the bearing housing 10 is short in the axial direction, the left side conical roller bearing 20L is omitted, and then a seal member 40 is provided instead. Specifically, the seal member 40 is an annular member that has an opening at its center portion and a boss portion 40A that is upright from the periphery of the opening. The boss portion 40A is loosely fitted around the sectional camshaft 30, and the annular outer peripheral portion is engaged with the annular groove 10C of the bearing housing 10. Thus, as in the case of the above embodiments, a hydraulic chamber 29 is defined between the facing surfaces of the seal member 40 and right rib 26RA and between the camshaft 30 and the bearing housing 10. The hydraulic chamber 29 constitutes part of the pressing mechanism.

Here, the conical roller bearing 20 according to the third embodiment is assembled in accordance with the following procedure. That is, the conical roller bearing 20 that incorporates the seal member 40, the inner ring 24, the outer ring 22F and the retainer 26 retaining the conical rollers 28 in the pockets is assembled to the camshaft 30. Then, the camshaft 30 to which the seal member 40 and the conical roller bearing 20 are assembled is set in the cam housing 10A, the annular outer peripheral portion of the seal member 40 is engaged with the annular groove 10C of the cam housing 10A, the pin 27 is attached to a predetermined position, and then the cap 10B is mounted on the cam housing 10A and fixed to the cam housing 10A by bolts, or the like.

Next, a conical roller bearing device for a camshaft according to an embodiment of the invention will be described with reference to FIG. 4. The embodiment of the conical roller bearing device for a camshaft is a preferred embodiment when the conical roller bearing devices according to the first to third embodiments described with reference to FIG. 1A to FIG. 3 are used for a camshaft. That is, the conical roller bearing device (however, the bearing housings and the seal members are omitted for the sake of easy illustration in FIG. 4) for a camshaft, shown in FIG. 4, is intended for the camshaft 30 of a four-cylinder reciprocating engine. The camshaft 30 has a first journal portion 1J at its front end side to which a cam sprocket (not shown) is connected, and a cam lobe journal portion is provided at a position between two cam lobes 30C corresponding to two intake valves or two exhaust valves provided in correspondence with each cylinder. That is, a second journal portion 2J is provided at a position corresponding to a first cylinder, and third to fifth journal portions 3J to 5J are respectively sequentially provided at positions corresponding to second to fourth cylinders. Then, any one of the double row conical roller bearings 20 shown in FIG. 1A to FIG. 2 is arranged at the first journal portion 1J, and the single conical roller bearing 20 shown in FIG. 3 is arranged at each of the second journal portion 2J to fifth journal portion 5J. Here, a single row conical roller bearing 20 in which oil that serves as a pressing mechanism and that is introduced into the hydraulic chamber 29 presses the retainer 26 in a first axial direction (rightward in FIG. 3) is termed a first conical roller bearing 20X, and a single row conical roller bearing 20 that is inverted by 180 degrees so that oil presses the retainer 26 in a second axial direction (leftward in FIG. 3) opposite to the first axial direction is termed a second conical roller bearing 20Y. At this time, in the conical roller bearing device for a camshaft according to the present embodiment, the first conical roller bearings 20X and the second conical roller bearings 20Y are arranged so that the total number of the first conical roller bearings 20X is equal to the total number of the second conical roller bearings 20Y.

Then, these first and second conical roller bearings 20X and 20Y are alternately arranged in accordance with the ignition order of the cylinders (which corresponds to the order of generation of a cam load that occurs when the cam lobes 30C open the intake valves or exhaust valves). For example, when the ignition order is the first cylinder, the third cylinder, the fourth cylinder and the second cylinder, the first and second conical roller bearings 20X and 20Y are alternately arranged in accordance with the order of the journal portions 2J, 4J, 5J and 3J. That is, when the first conical roller bearing 20X is arranged at the second journal portion 2J, the second conical roller bearing 20Y is arranged at the fourth journal portion 4J, the first conical roller bearing 20X is arranged at the fifth journal portion 5J, and the second conical roller bearing 20Y is arranged at the third journal portion 3J. Note that, as long as the first and second conical roller bearings 20X and 20Y are alternately arranged in accordance with the above order, the positions of the first and second conical roller bearing 20X and 20Y may be deviated.

In this way, when the first and second conical roller bearings 20X and 20Y are arranged so that the total number of the first conical roller bearings 20X is equal to the total number of the second conical roller bearings 20Y, axial loads (thrust loads) are cancelled, so it is possible to reduce the number of conical roller bearings required, and it is possible to suppress the overall length of the camshaft 30 and, by extension, the overall length of the engine. In addition, when the first and second conical roller bearings 20X and 20Y are alternately arranged in accordance with the ignition order, even when thrust loads occur, opposite thrust loads alternately occur in accordance with the ignition order, so it is possible to reduce a load on the bearing housing 10 in comparison with the case where thrust loads in the same direction successively occur.

Furthermore, the above described embodiment is an example in which the aspect of the invention is used for the camshaft of a four-cylinder reciprocating engine; however, the aspect of the invention is not limited to this configuration. The aspect of the invention may also be applied to a conical roller bearing device for a camshaft of another even-number-cylinder reciprocating engine. In addition, of course, the aspect of the invention may also be applied to not only a conical roller bearing device for a camshaft of an engine but also a conical roller bearing device for another rotary shaft.

The invention claimed is:

1. A conical roller bearing device comprising:
a conical roller bearing that includes an inner ring that has an outer raceway surface on its outer peripheral surface, an outer ring that has an inner raceway surface on its inner peripheral surface, a retainer, and a plurality of conical rollers that are rollably arranged between the outer raceway surface of the inner ring and the inner raceway surface of the outer ring and that are respectively accommodated in pockets formed in the retainer; and
a pressing mechanism including a hydraulic chamber and a hydraulic supply portion, wherein the hydraulic supply portion supplies a redetermined hydraulic pressure to the hydraulic chamber that presses the retainer in a direction to reduce gaps between the conical rollers and the outer raceway surface of the inner ring and gaps between the conical rollers and the inner raceway surface of the outer ring along center axes of the inner ring and outer ring to thereby apply a preload, wherein
the hydraulic chamber is defined by a rib formed in the retainer so as to be positioned on a side of the inner ring and outer ring in an axial direction.

2. The conical roller bearing device according to claim 1, further comprising:
a displacement restricting mechanism that restricts an amount of displacement of the retainer in a direction opposite to the direction in which the pressing mechanism presses the retainer.

3. The conical roller bearing device according to claim 1, further comprising
a seal member, wherein
the hydraulic chamber is defined between the rib and the seal member.

4. The conical roller bearing device according to claim 1, wherein
the conical roller bearing is a double row conical roller bearing, and
the hydraulic chamber is defined between the ribs that are respectively formed in the double row retainers.

5. The conical roller bearing device according to claim 4, further comprising:
a displacement restricting mechanism that restricts an amount of displacement of the retainer in a direction opposite to the direction in which the pressing mechanism presses the retainer, wherein
the displacement restricting mechanism is provided between the ribs.

6. The conical roller bearing device according to claim 1, wherein
the inner raceway surface of the outer ring is parallel to the center axis of the outer ring.

* * * * *